(12) United States Patent
Oda et al.

(10) Patent No.: US 10,938,142 B2
(45) Date of Patent: Mar. 2, 2021

(54) ELECTRICAL CONNECTION BOX

(71) Applicants: Sumitomo Wiring Systems, Ltd., Mie (JP); TOYOTA JIDOSHA KABUSHIKI KAISHA, Toyota (JP)

(72) Inventors: Maiko Oda, Mie (JP); Kiyofumi Kawaguchi, Mie (JP); Tatsuya Fujisaka, Mie (JP); Takenori Kobayashi, Toyota (JP); Junta Katayama, Miyoshi (JP)

(73) Assignees: Sumitomo Wiring Systems, Ltd., Mie (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/682,479

(22) Filed: Nov. 13, 2019

(65) Prior Publication Data
US 2020/0161799 A1 May 21, 2020

(30) Foreign Application Priority Data
Nov. 16, 2018 (JP) .............................. JP2018-215608

(51) Int. Cl.
*B60R 16/023* (2006.01)
*H01R 13/518* (2006.01)
*H02G 3/08* (2006.01)
*B60R 16/02* (2006.01)

(52) U.S. Cl.
CPC ....... *H01R 13/518* (2013.01); *B60R 16/0238* (2013.01); *H02G 3/081* (2013.01); *B60R 16/0207* (2013.01); *H01R 2201/26* (2013.01)

(58) Field of Classification Search
CPC ............ B60R 16/0238; B60R 16/0207; B60R 16/023; H01R 13/518; H01R 2201/26; H02G 3/081; H02G 3/08
USPC .................................................... 174/559, 50
See application file for complete search history.

(56) References Cited

U.S. PATENT DOCUMENTS

| | | | | |
|---|---|---|---|---|
| 5,266,260 A | * | 11/1993 | Hentschel | B29C 31/041 264/310 |
| 2010/0300722 A1 | * | 12/2010 | Kita | B60R 16/0238 174/50 |
| 2017/0174152 A1 | * | 6/2017 | Yamaguchi | H01B 7/0045 |
| 2017/0311460 A1 | | 10/2017 | Ozaki | |

FOREIGN PATENT DOCUMENTS

| | | |
|---|---|---|
| CN | 2276733 Y | 3/1998 |
| CN | 1385358 A | 12/2002 |
| CN | 105048375 A | 11/2015 |
| CN | 206451880 U | 8/2017 |
| CN | 206561823 U | 10/2017 |

(Continued)

*Primary Examiner* — Timothy J Thompson
*Assistant Examiner* — Guillermo J Egoavil
(74) *Attorney, Agent, or Firm* — Honigman LLP

(57) ABSTRACT

An electrical connection box comprising a box main body that accommodates an electrical component and a connector for connection with an electrical wire that is provided in a protruding manner on an outer surface of the box main body, the electrical connection box being mounted on a vehicle and used for connection of a plurality of on-board loads to an on-board power supply comprises a protector that is provided in a protruding manner along a protrusion direction of the connector and protects the connector.

2 Claims, 4 Drawing Sheets

(56) References Cited

FOREIGN PATENT DOCUMENTS

| | | | | |
|---|---|---|---|---|
| JP | 2001223489 A | * | 8/2001 | ............... H05K 7/20 |
| JP | 2002-171639 A | | 6/2002 | |
| JP | 2010-167816 A | | 8/2010 | |
| JP | 2011-101511 A | | 5/2011 | |
| JP | 2012-126152 A | | 7/2012 | |
| JP | 2013-121779 A | | 6/2013 | |
| JP | 2017-079547 A | | 4/2017 | |
| JP | 2017-200269 A | | 11/2017 | |

* cited by examiner

ELECTRICAL CONNECTION BOX

CROSS-REFERENCE TO RELATED APPLICATION

This application claims priority to Japanese Patent Application JP No. 2018-215608 filed on Nov. 16, 2018, the entire contents of which are hereby incorporated by reference.

FIELD

The present disclosure relates to an electrical connection box.

BACKGROUND

A vehicle is mounted with an electrical connection box (Japanese Patent Application Laid-Open Publication No. 2017-200269) used for connecting an on-board load such as lamps, wipers, motors or the like to an on-board power supply. The electrical connection box has a box main body for accommodating an electrical component connected to the on-board load through an electric wire such as a wire harness or the like.

In some cases, a connector for connection with an electric wire that is electrically connected to the electrical component is provided in a protruding manner on an external surface of the box main body. An electric wire connected to the on-board load is connected to the connector to allow for electrical connection between the electrical component inside the electrical connection box and the on-board load.

However, if the electrical connection box is disposed in a luggage compartment, for example, and an object such as a spare tire around the electrical connection box hits the connector by an unexpected external force to damage the connector, the terminal is exposed from the connector, which may impart an electrical shock to the operator.

It is an object of the present disclosure to provide an electrical connection box capable of preventing damage to the connector.

SUMMARY

An electrical connection box according to one aspect of the present disclosure comprising a box main body that accommodates an electrical component and a connector for connection with an electrical wire that is provided in a protruding manner on an outer surface of the box main body, the electrical connection box being mounted on a vehicle and used for connection of a plurality of on-board loads to an on-board power supply comprises a protector that is provided in a protruding manner along a protrusion direction of the connector and protects the connector.

According to the above description, it is possible to prevent damage to the connector.

The above and further objects and features will more fully be apparent from the following detailed description with accompanying drawings.

DETAILED DESCRIPTION

Figure 1:
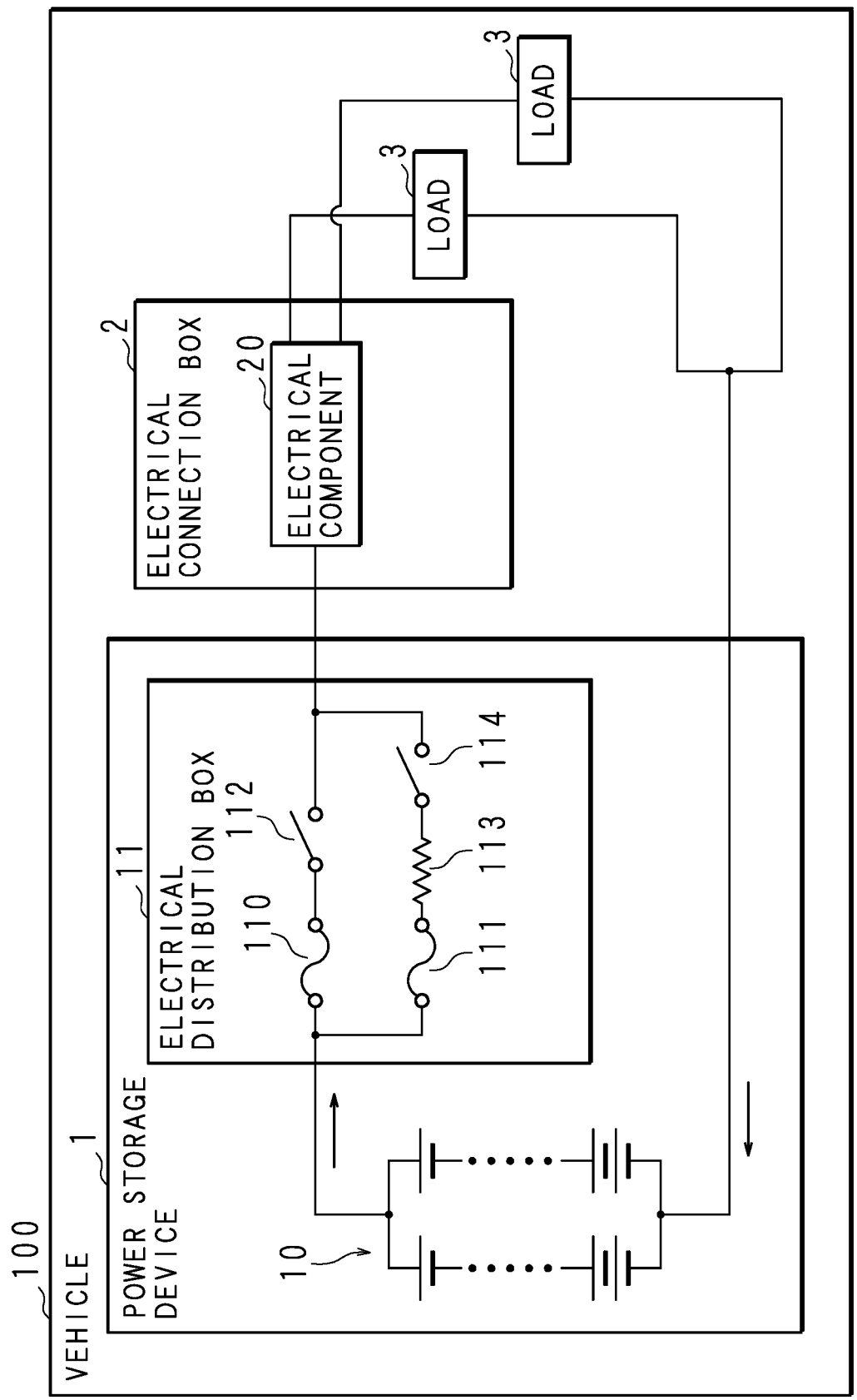
FIG. 1 is a block diagram illustrating the configuration of an electrical distribution system of a vehicle provided with an electrical connection box according to an embodiment.

An embodiment of the present disclosure is described. Here, at least parts of the embodiment described below may arbitrarily be combined.

An electrical connection box according to one aspect of the present disclosure is an electrical connection box comprising a box main body that accommodates an electrical component and a connector for connection with an electrical wire that is provided in a protruding manner on an outer surface of the box main body, the electrical connection box being mounted on a vehicle and used for connection of multiple on-board loads to an on-board power supply comprises a protector that is provided in a protruding manner along a protrusion direction of the connector and protects the connector.

In this aspect, if an object such as a spare tire or the like hits the electrical connection box from the protector side by an unexpected external force, the object can be prevented from hitting the connector. This makes it possible to prevent damage to the connector.

In the electrical connection box according to one aspect of the present disclosure, the protector is hollow columnar.

In this aspect, the protector is hollow columnar, so that if an object hits the protector, the protector can be crushed toward the hollow portion and can absorb the impact. Accordingly, the object can more favorably be prevented from hitting the connector.

In the electrical connection box according to one aspect of the present disclosure, the protector has a first wall portion positioned on a side that faces the connector and a second wall portion positioned on a side of the first wall portion that is opposite to the side of the first wall portion that faces the connector, the second wall portion being thinner than the first wall portion.

In this aspect, the second wall portion is formed thin to allow the protector to be easily crushed from the second wall portion side and to more easily absorb the impact. Furthermore, the first wall portion is formed thick to allow the protector to be resistant to greater impact. This makes it possible to more favorably prevent the connector from being hit.

In the electrical connection box according to one aspect of the present disclosure, an outer surface of the second wall portion is tapered.

In this aspect, if an object hits the second wall portion, its course can be changed. This makes it possible to more favorably prevent the connector from being hit.

In the electrical connection box according to one aspect of the present disclosure, the first wall portion being extended along the connector, and the second wall portion is continuous to an extended end of the first wall portion to form an acute angle with respect to the first wall portion.

In this aspect, if the electrical connection box and a spare tire are disposed in the luggage compartment, the circumferential surface of the spare tire and the second wall portion are arranged to be opposed to each other to thereby save space.

The present disclosure will be described in detail below with reference to the drawings of an embodiment thereof.

FIG. 1 is a block diagram illustrating the configuration of an electrical distribution system of a vehicle provided with an electrical connection box according to the embodiment. The reference numeral 100 in the drawing represents a vehicle, and the vehicle 100 includes a power storage device 1, an electrical connection box 2 connected to the power storage device 1 through an electric wire such as a wire harness or the like and multiple loads 3 (two in the drawing) connected to the electrical connection box 2 through electric wires such as wire harnesses or the like. The power storage device 1 is disposed in an engine compartment, for example, while the electrical connection box 2 is disposed in a luggage compartment, for example.

The power storage device 1 includes a storage battery 10 and an electrical distribution box 11. The storage battery 10 is, for example, a lithium battery and a secondary battery including battery cells connected in series-parallel manner. The electrical distribution box 11 includes multiple systems for distributing power from the storage battery 10 to the respective on-board loads. Note that FIG. 1 illustrates only the system supplying power to the electrical connection box 2.

The electrical distribution box 11 includes two fuses 110 and 111, a switch 112, a resistor 113, a switch 114 and so on that constitute one system inside a housing (not illustrated) made waterproof by a seal member, for example. The first ends of the fuses 110 and 111 are connected in parallel to the cathode of the storage battery 10. The second end of the fuse 110 is connected to the first end of the switch 112. The second end of the fuse 111 is connected to the first end of the switch 114 via the resistor 113.

The second ends of the switches 112 and 114 are connected to the electrical connection box 2. The switches 112 and 114 are normally-open contacts, for example, and are selectively turned on in response to an operation instruction from an electronic control unit (ECU) (not illustrated).

The electrical connection box 2 supplies power supplied from the electrical distribution box 11 to the multiple loads 3. The electrical connection box 2 has an electrical component 20 connected to the switches 112 and 114 in the electrical distribution box 11 and the loads 3 through electric wires such as wire harnesses or the like. The electrical component 20 includes a fuse, a bus bar or the like. The loads 3 are on-board loads such as lamps, wipers, motors or the like. One end of each load 3 is connected to the electrical component 20 while the other end thereof is connected to the anode of the storage battery 10.

In the configuration described above, current flows from the cathode of the storage battery 10 through the electrical distribution box 11 and the electrical connection box 2 to the loads 3 and returns to the anode of the storage battery 10 as illustrated by the arrows in the drawing.

When the load 3 is activated, the switch 114 is turned on. This causes current to flow in the resistor 113 side, which reduces rush current. The switch 114 is then turned off while the switch 112 is turned on, which causes current to flow in the load 3. The fuses 110 and 111 can interrupt power supply to the loads 3 if current of a value equal to or larger than a predetermined current value flows.

Figure 2:
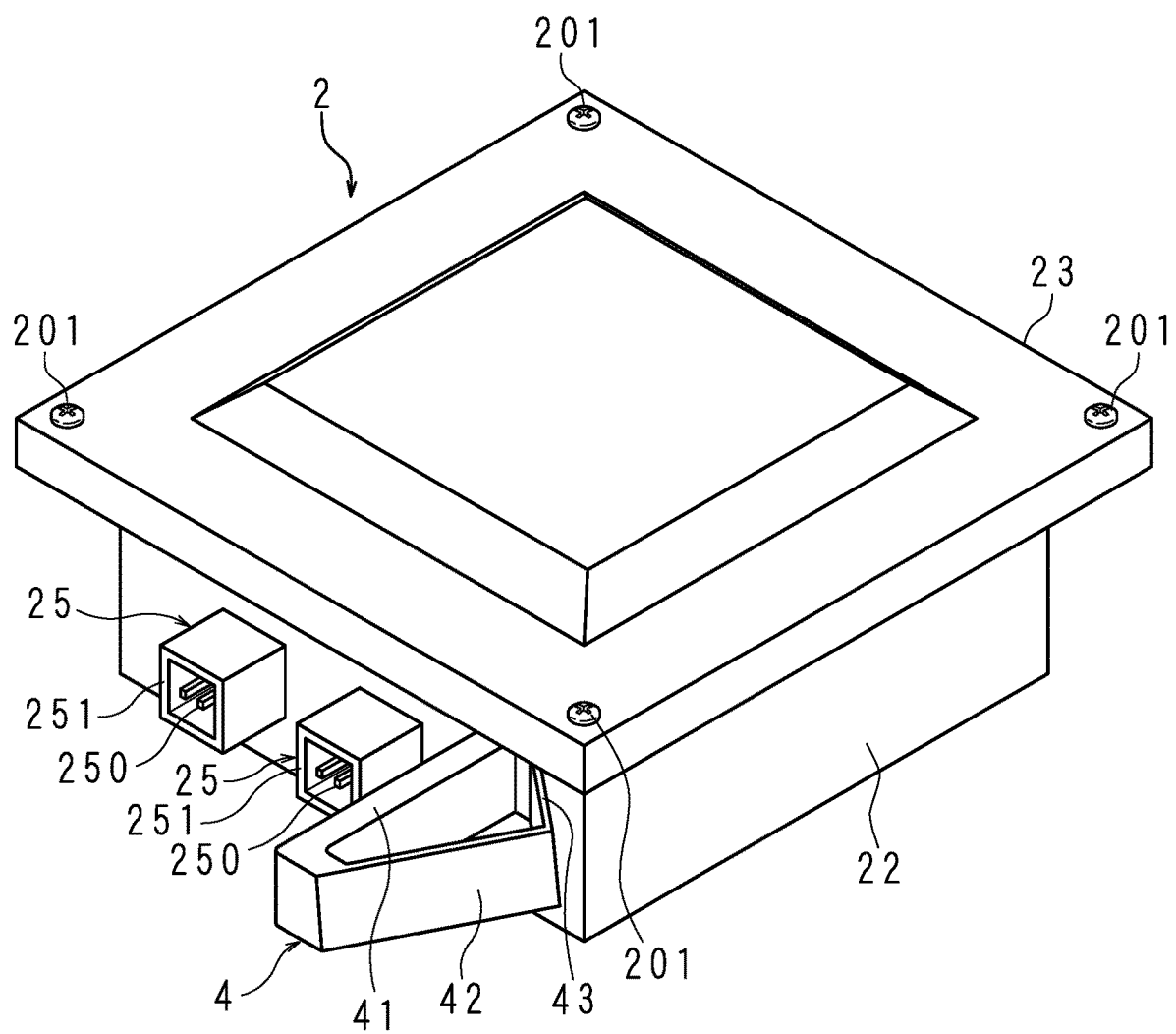
FIG. 2 is an external perspective view of the electrical connection box.
Figure 3:
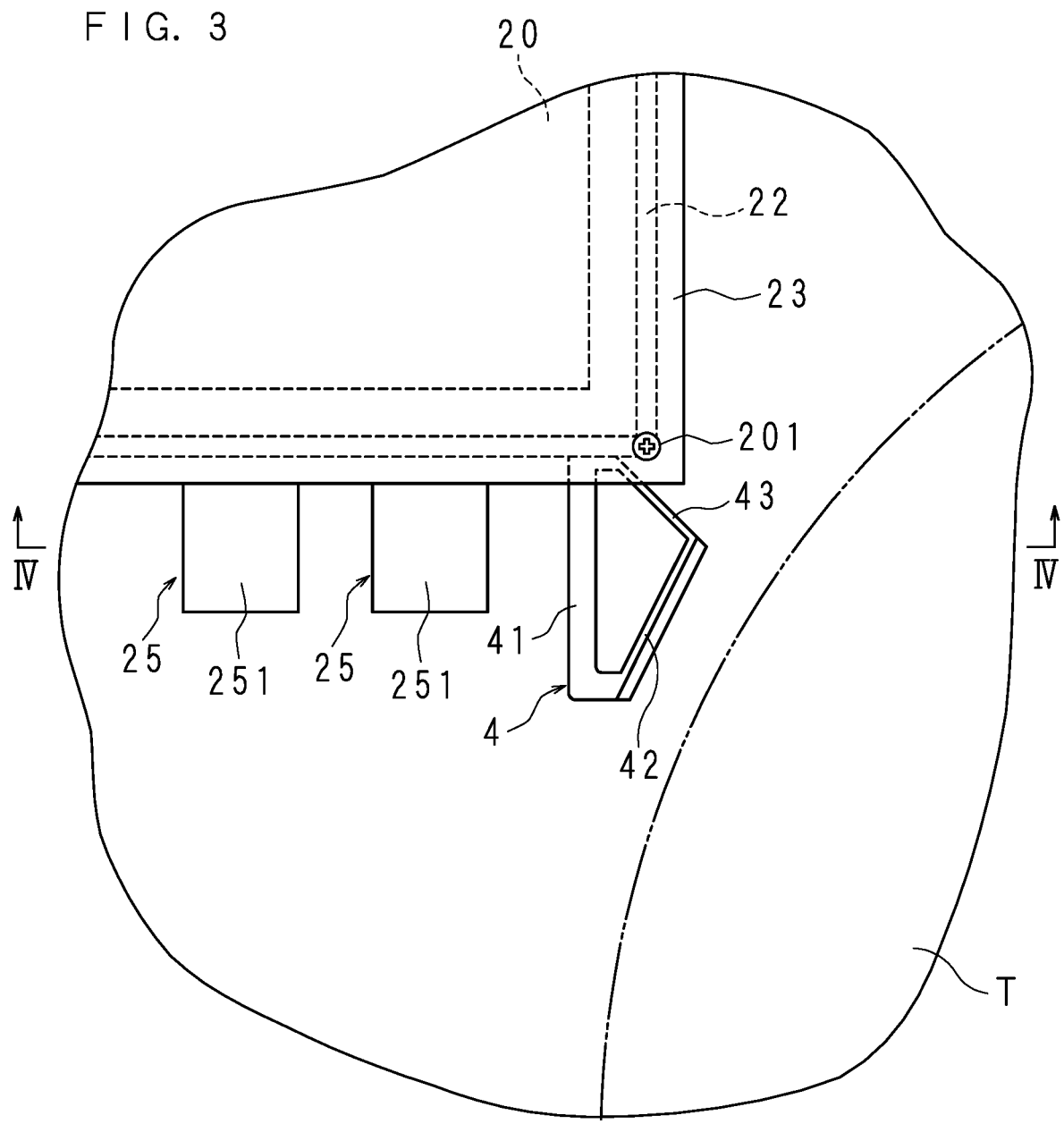
FIG. 3 is a plan view illustrating an installation manner of the electrical connection box.

FIG. 2 is an external perspective view of the electrical connection box 2. FIG. 3 is a plan view illustrating an installation manner of the electrical connection box 2. The electrical connection box 2 has a rectangular parallelepiped box main body 22 having an opening on one surface of the box main body 22. The electrical connection box 2 has a cover body 23 covering the opening of the box main body 22. The electrical connection box 2 is mounted on the vehicle 100 while turning the opening of the box main body 22 upward.

The cover body 23 has a rectangular board shape and has external dimensions larger than those of the opening of the box main body 22. The cover body 23 is placed on the box main body 22 and secured at the four corners by screws 201 such that its bottom surface abuts against the flange portion of the box main body 22.

The box main body 22 accommodates the electrical component 20 (see FIG. 3). The box main body 22 has one side wall on which two connectors 25 and 25 are provided in a protruding manner. The one side wall is long in the lateral direction while the connectors 25 are aligned in the direction of the length of the one side wall. Each connector 25 has a bar-like terminal 250 and a frame part 251. The terminal 250 is electrically connected to the electrical component 20 while having one end portion protruding from the one side wall. The frame part 251 protrudes from the one side wall along the protrusion direction of the terminal and encloses the terminal 250. The protrusion length of the frame part 251 is greater than that of the terminal 250.

To each of the connectors 25, an electric wire such as a wire harness or the like (not illustrated) is connected. Note that the number of the connectors 25 is not limited to the illustrated number.

On the one side wall of the box main body 22, a protector 4 is provided in a protruding manner. That is, the connectors 25 and 25 and the protector 4 are provided on the same one side wall. The protector 4 is provided at one end in the direction of the length of the one side surface. The protector 4 has a hollow columnar shape having an opening in the up-down direction and has an outer peripheral surface continuous to the one side wall.

The protector 4 has a first wall portion 41 positioned on a side that faces the connector 25, and a second wall portion 42 and a third wall portion 43 that are positioned on a side of the first wall portion 41 that is opposite to the the side of the first wall portion 41 that faces the connector 25.

The first wall portion 41 rises substantially vertically from the one side wall. That is, the first wall portion 41 extends substantially parallel to the protrusion direction of the connector 25 from the one side wall. The third wall portion 43 extends from the one side wall to form an acute angle with respect to the first wall portion 41 and has the base end portion continuous to the first wall portion 41. The second wall portion 42 is continuous to the extended end portion of the first wall portion 41 and the extended end portion of the third wall portion 43. The first wall portion 41 and the second wall portion 42 intersect each other to form an acute angle while the second wall portion 42 and the third wall portion 43 intersect each other to form an obtuse angle. Hence, the first wall portion 41, the second wall portion 42 and the third wall portion 43 are configured to form a hollow column.

Figure 4:
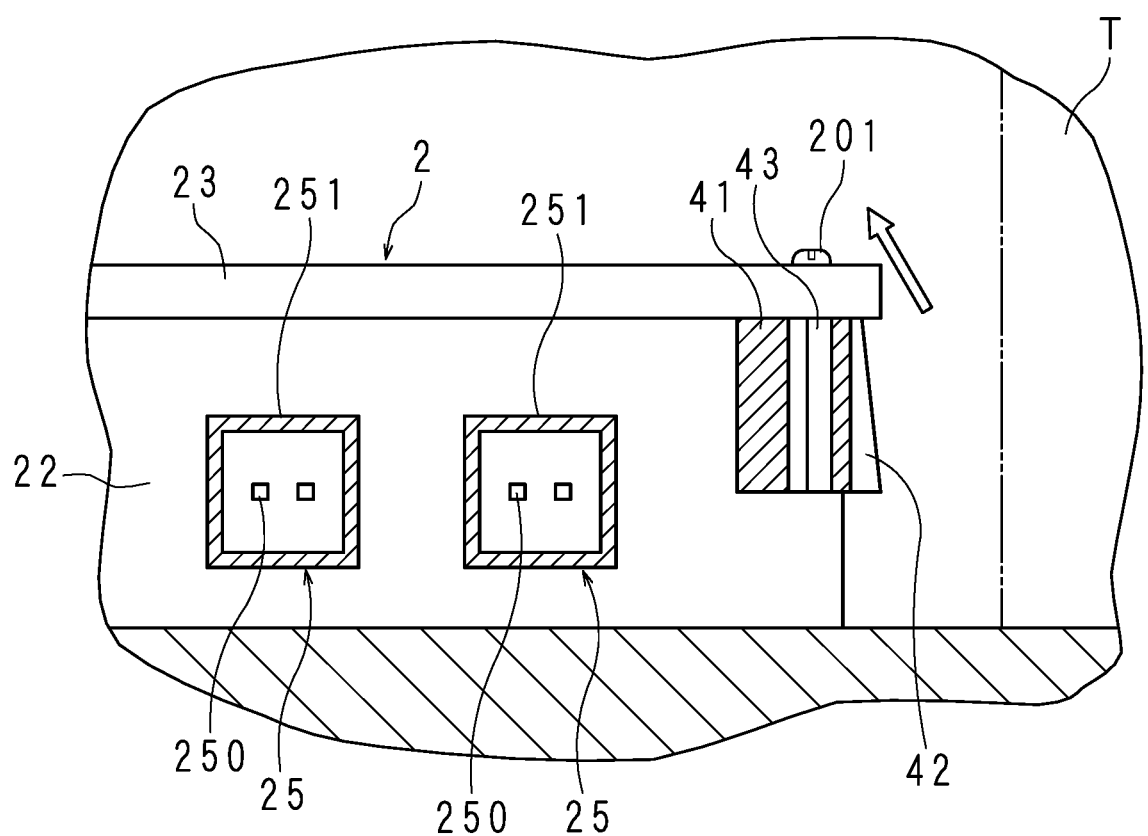
FIG. 4 is a cross-sectional view taken along IV-IV of FIG. 3.

The second wall portion 42 and the third wall portion 43 are formed thinner than the first wall portion 41. The first wall portion 41 is formed thick. FIG. 4 is a cross-sectional view taken along IV-IV of FIG. 3. The outer surface of the second wall portion 42 is tapered so that the distance from the first wall portion 41 is larger at the bottom side.

Meanwhile, as illustrated in FIG. 3 and FIG. 4, a spare tire T is laid down on the floor in the luggage compartment. The electrical connection box 2 is installed near the spare tire T with the second wall portion 42 of the protector 4 opposed to the circumferential surface of the spare tire T.

According to this arrangement, if an unexpected external force is laterally applied to an object such as a spare tire T or the like, the spare tire T hits the protector 4 from the second wall portion 42 side. Here, the protector 4 is hollow columnar, so that if the protector 4 is hit by the spare tire T, the second wall portion 42 can be crushed toward the hollow portion and absorb the impact. Thus, the object can more favorably be prevented from hitting the connector 25 if the object hits the electrical connection box 2 from the protector 4 side. Alternatively, even if the object hits the connector 25, the impact can be reduced. Thus, it is possible to prevent damage to the connector 25.

Moreover, the second wall portion 42 is formed thin, so that the protector 4 is easy to be crushed from the second wall portion 42 side and is thus easier to absorb impact. In addition, the first wall portion 41 is formed thick to be resistant to greater impact. Thus, the spare tire T can more favorably be prevented from hitting the connector 25. If the object hits the connector 25, the impact can be reduced.

The outer surface of the second wall portion 42 is tapered, so that if the spare tire T hits the protector 4, the course of the spare tire T can be changed. More specifically, the spare tire T moves substantially laterally before hitting the second wall portion 42 though the spare tire T changes its course to obliquely upward as illustrated by an outline arrow if hitting the second wall portion 42. Thus, the spare tire T can more favorably be prevented from hitting the connector 25.

Note that the protector 4 may take another shape such as a block shape or the like. Alternatively, the protector 4 may be provided in an electrical connection box or an electrical distribution box that is installed in another site and is configured to have a side wall from which a connector protrudes as well as the electrical connection box 2 installed in the luggage compartment. In addition, the connectors 25 and 25 and the protector 4 are not limited to be provided on the same side wall. The protector 4 may be provided on another side wall different from the one side wall on which the connector 25 is provided. The protector 4 may be acceptable if it is positioned between the object such as a spare tire T or the like and the connector 25 and in the course of the spare tire T in the case where an unexpected external force is applied and provided such that the course of the spare tire T is changeable in the case where the unexpected external force is applied.

It is to be understood that the embodiment disclosed here is illustrative in all respects and not restrictive. The scope of the present invention is defined by the appended claims, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An electrical connection box being mounted on a vehicle and used for connection of a plurality of on-board loads to an on-board power supply, the electrical connection box comprising:
    a main body that accommodates an electrical component,
    a connector for an electrical wire connection that is provided in a protruding manner on an outer surface of the box main body, and
    a protector that is provided in a protruding manner along a protrusion direction of the connector and protects the connector, wherein the protector is hollow columnar, and wherein the protector has a first wall portion having a side that faces the connector and a second wall portion positioned on a second side of the first wall portion, the second side being opposite to the side of the first wall portion that faces the connector, and the second wall portion being thinner than the first wall portion; and
    wherein an outer surface of the second wall portion is tapered.

2. An electrical connection box being mounted on a vehicle and used for connection of a plurality of on-board loads to an on-board power supply, the electrical connection box comprising:
    a main body that accommodates an electrical component,
    a connector for an electrical wire connection that is provided in a protruding manner on an outer surface of the box main body, and
    a protector that is provided in a protruding manner along a protrusion direction of the connector and protects the connector, wherein the protector is hollow columnar, and wherein the protector has a first wall portion having a side that faces the connector and a second wall portion positioned on a second side of the first wall portion, the second side being opposite to the side of the first wall portion that faces the connector, the second wall portion being thinner than the first wall portion;
    the first wall portion being extended along the connector, and
    the second wall portion is continuous to an extended end of the first wall portion to form an acute angle with respect to the first wall portion.

* * * * *